(12) United States Patent
Lu (10) Patent No.: US 11,087,372 B2
(45) Date of Patent: Aug. 10, 2021

(54) BENEFIT ALLOCATION METHOD, APPARATUS, AND ELECTRONIC DEVICE

(71) Applicant: Advanced New Technologies Co., Ltd., Grand Cayman (KY)

(72) Inventor: Xuming Lu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/081,702

(22) Filed: Oct. 27, 2020

(65) Prior Publication Data

US 2021/0042741 A1 Feb. 11, 2021

Related U.S. Application Data

(63) Continuation of application No. PCT/CN2019/084653, filed on Apr. 26, 2019.

(30) Foreign Application Priority Data

Jul. 27, 2018 (CN) .......................... 201810845016.0

(51) Int. Cl.
*G06Q 30/06* (2012.01)
*G06F 21/60* (2013.01)
(Continued)

(52) U.S. Cl.
CPC ........... *G06Q 30/06* (2013.01); *G06F 21/602* (2013.01); *G06F 21/64* (2013.01); *G06Q 20/389* (2013.01)

(58) Field of Classification Search
None
See application file for complete search history.

(56) References Cited

U.S. PATENT DOCUMENTS 9,436,923 B1 * 9/2016 Shram ................. G06Q 10/0833
2015/0302400 A1 * 10/2015 Metral .................... G06Q 40/12
705/75
(Continued)

FOREIGN PATENT DOCUMENTS

| CN | 106600405 | 4/2017 |
| CN | 107423945 | 12/2017 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — John W Hayes
*Assistant Examiner* — Dennis G Keritsis
(74) *Attorney, Agent, or Firm* — Fish & Richardson P.C.

(57) ABSTRACT

A computer-implemented method includes receiving a participation request from a participant requesting a blockchain resource; invoking a first smart contract that generates a random character sequence for the participant, the generated random character sequence satisfying a predetermined rule; publishing the random character sequence and identity information of the corresponding participant on a blockchain in a manner that identifies the correspondence; and invoking a second smart contract for allocating a benefit certificate corresponding to the blockchain resource to the participant, wherein the second smart contract is used to: obtain a target character sequence satisfying the predetermined rule that is generated later than the generation of the random character sequence and published on the blockchain; and allocate a first benefit certificate to the participant when the random character sequence matches the target character sequence; and publishing a matching result between the random char- (Continued)

acter sequence and the target character sequence on the blockchain.

17 Claims, 6 Drawing Sheets

(51) Int. Cl.
*G06F 21/64* (2013.01)
*G06Q 20/38* (2012.01)

(56) References Cited

U.S. PATENT DOCUMENTS

| | | | | |
|---|---|---|---|---|
| 2016/0098730 | A1* | 4/2016 | Feeney | G06Q 20/3825 705/71 |
| 2017/0243213 | A1* | 8/2017 | Castinado | G06Q 20/352 |
| 2017/0287068 | A1* | 10/2017 | Nugent | G06Q 20/065 |
| 2017/0352012 | A1* | 12/2017 | Hearn | G06Q 50/18 |
| 2018/0096360 | A1* | 4/2018 | Christidis | G06Q 20/02 |
| 2018/0117446 | A1 | 5/2018 | Tran et al. | |
| 2018/0130050 | A1* | 5/2018 | Taylor | H04L 9/3247 |
| 2018/0191503 | A1* | 7/2018 | Alwar | H04L 9/0637 |
| 2018/0191714 | A1 | 7/2018 | Jentzsch et al. | |
| 2018/0204191 | A1* | 7/2018 | Wilson | H04L 9/3242 |

FOREIGN PATENT DOCUMENTS

| | | | |
|---|---|---|---|
| CN | 107819582 | 3/2018 | |
| CN | 107993047 | 5/2018 | |
| CN | 108234515 | 6/2018 | |
| CN | 108985644 | 12/2018 | |
| TW | I614712 | 2/2018 | |
| WO | WO-2015085393 A1 * | 6/2015 | ............ G06Q 40/02 |
| WO | WO2017112019 | 6/2017 | |
| WO | WO-2017112019 A1 * | 6/2017 | ............ G06F 21/45 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2019/084653, dated Jul. 31, 2019, 9 pages (with partial English translation).
PCT International Preliminary Report on Patentability in International Application No. PCT/CN2019/084653, dated Feb. 2, 2021, 10 pages (with English translation).
Extended European Search Report in European Application No. 19840641.5, dated May 4, 2021, 10 pages.

* cited by examiner

```
┌─────────────────────────────────────────────────────────────────────────┐
│ Invoke a first smart contract for generating a character sequence, where the first smart │─ 102
│ contract is used to generate a random character sequence that satisfies a predetermined │
│ rule for a participant, and a first generation moment of the random character sequence is │
│ earlier than a second generation moment of a target character sequence that satisfies the │
│                              predetermined rule                                         │
└─────────────────────────────────────────────────────────────────────────┘
                                       │
                                       ▼
┌─────────────────────────────────────────────────────────────────────────┐
│    Publish the random character sequence and identity information of the corresponding   │─ 104
│         participant on a blockchain in the way that identifies the correspondence        │
└─────────────────────────────────────────────────────────────────────────┘
                                       │
                                       ▼
┌─────────────────────────────────────────────────────────────────────────┐
│ Invoke a second smart contract for allocating benefit certificates, where the second smart │─ 106
│  contract is used to read the random character sequence and the target character sequence │
│     and to allocate a first benefit certificate to the participant when the random character │
│                     sequence matches the target character sequence                       │
└─────────────────────────────────────────────────────────────────────────┘
```

BENEFIT ALLOCATION METHOD, APPARATUS, AND ELECTRONIC DEVICE

CROSS-REFERENCE TO RELATED APPLICATIONS

This application is a continuation of PCT Application No. PCT/CN2019/084653, filed on Apr. 26, 2019, which claims priority to Chinese Patent Application No. 201810845016.0, filed on Jul. 27, 2018, and each application is hereby incorporated by reference in its entirety.

TECHNICAL FIELD

One or more implementations of the present specification relate to the field of blockchain technologies, and in particular, to benefit allocation methods, apparatuses, and electronic devices.

BACKGROUND

In the process of allocating benefits such as permission to use network resources, permission to use storage resources, and permission to invoke data resources, there are usually limited benefits that can be allocated while there are many participants involved in allocation. If benefits are equally allocated, few benefits are allocated to each participant, affecting normal use of the benefits. In addition, benefits in some cases cannot be divided. Therefore, a selection needs to be made between participants, so that benefits are allocated to selected participants.

SUMMARY

In view of this, one or more implementations of the present specification provide benefit allocation methods, apparatuses, and electronic devices.

To achieve the previous objective, technical solutions provided in the one or more implementations of the present specification are as follows:

According to a first aspect of the one or more implementations of the present specification, a benefit allocation method is provided, and is applied to a blockchain node, and the method includes: invoking a first smart contract for generating a character sequence, where the first smart contract is used to generate a random character sequence that satisfies a predetermined rule for a participant, and a first generation moment of the random character sequence is earlier than a second generation moment of a target character sequence that satisfies the predetermined rule; publishing the random character sequence and identity information of the corresponding participant on a blockchain in a way that identifies the correspondence; and invoking a second smart contract for allocating benefit certificates, where the second smart contract is used to read the random character sequence and the target character sequence and to allocate a first benefit certificate to the participant when the random character sequence matches the target character sequence.

According to a second aspect of the one or more implementations of the present specification, a benefit allocation apparatus is provided, and is applied to a blockchain node, and the apparatus includes: a first invoking unit, configured to invoke a first smart contract for generating a character sequence, where the first smart contract is used to generate a random character sequence that satisfies a predetermined rule for a participant, and a first generation moment of the random character sequence is earlier than a second generation moment of a target character sequence that satisfies the predetermined rule; a first publication unit, configured to publish the random character sequence and identity information of the corresponding participant on a blockchain in the way that identifies the correspondence; and a second invoking unit, configured to invoke a second smart contract for allocating benefit certificates, where the second smart contract is used to read the random character sequence and the target character sequence and to allocate a first benefit certificate to the participant when the random character sequence matches the target character sequence.

According to a third aspect of the one or more implementations of the present specification, an electronic device is provided, and includes: a processor; and a memory, configured to store a processor executable instruction, where the processor implements the benefit allocation method in any one of the previous implementations by running the executable instruction.

DESCRIPTION OF IMPLEMENTATIONS

Example implementations are described here in detail, and examples of the illustrative implementations are shown in the accompanying drawings. When the following description relates to the accompanying drawings, the same numbers in different drawings represent the same or similar elements, unless otherwise indicated. Implementations described in the following example implementations do not represent all implementations consistent with the one or more implementations of the present specification. On the contrary, the implementations are merely examples of apparatuses and methods that are consistent with some aspects of the one or more implementations of the present specification and are described in detail in the appended claims.

It is worthwhile to note that in other implementations, steps of a corresponding method are not necessarily performed in an order shown and described in the present specification. In some other implementations, the method can include more or fewer steps than those described in the present specification. In addition, a single step described in the present specification can be divided into multiple steps for description in other implementations, and multiple steps described in the present specification can be combined into a single step for description in other implementations.

Figure 1:
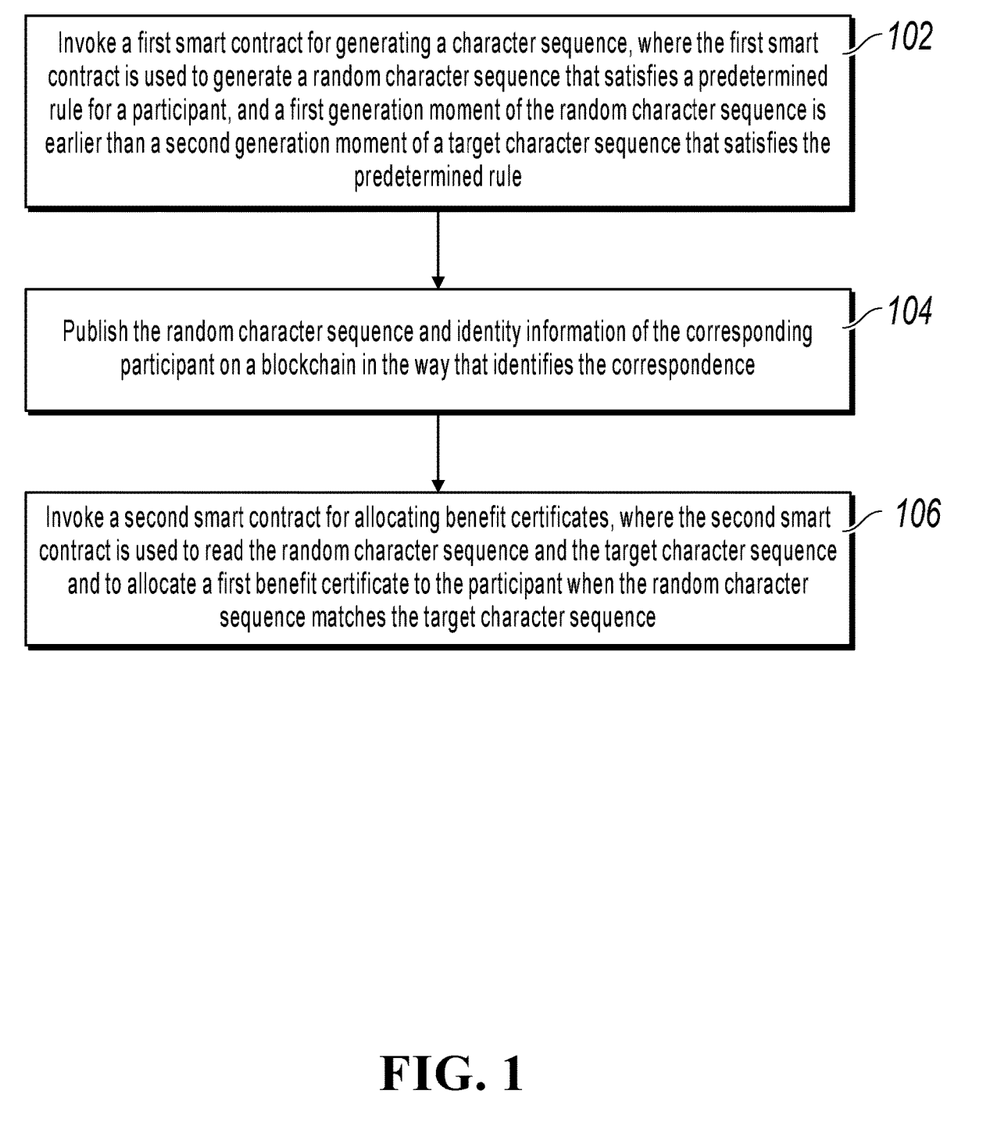
FIG. 1 is a flowchart illustrating a benefit allocation method, according to an example implementation.

FIG. 1 is a flowchart illustrating a benefit allocation method, according to an implementation. As shown in FIG. 1, the method is applied to a blockchain node, and can include the following steps.

Step 102: Invoke a first smart contract for generating a character sequence, where the first smart contract is used to generate a random character sequence that satisfies a predetermined rule for a participant, and a first generation moment of the random character sequence is earlier than a second generation moment of a target character sequence that satisfies the predetermined rule.

In some implementations, a transaction (transfer) is created on a client device on a blockchain, and invoking of a smart contract such as the first smart contract described above or a second smart contract described below can be triggered by using the transaction.

In some implementations, processing logic for generating a random character sequence that satisfies the predetermined rule can be pre-written in the first smart contract, so that after the first smart contract is invoked, a random character sequence that satisfies the predetermined rule can be automatically generated based on the processing logic. The processing logic in the first smart contract is public content, and the entire processing process is automatically completed by using the first smart contract without manual intervention. Therefore, randomness of the generated random character sequence can be ensured, and it can be ensured that the generated random character sequence satisfies the predetermined rule.

In some implementations, the predetermined rule is used to indicate combination conditions that need to be satisfied by the random character sequence, for example, the quantity of characters included in the sequence, a type of character, and a value range of the character. Implementations are not limited in the present specification. For example, the predetermined rule can specify that the random character sequence includes eight digits. In this case, the sequence "45614381" satisfies the predetermined rule, and the sequence "ax0642f0" does not satisfy the predetermined rule. For another example, the predetermined rule can specify that the random character sequence includes five digits plus three letters. In this case, the sequence "45614381" does not satisfy the predetermined rule, and the sequence "ax0642f0" satisfies the predetermined rule.

In some implementations, because the first smart contract is used to randomly generate a random character sequence corresponding to each participant, random character sequences corresponding to different participants may be the same or different, and need to be determined based on actual situations.

Step 104: Publish the random character sequence and identity information of the corresponding participant on a blockchain in the way that identifies the correspondence.

In some implementations, a transaction is created on a client device on the blockchain, and a prediction result entered by the participant can be published on the blockchain as a piece of data in a distributed database of the blockchain by using the transaction.

It is worthwhile to note that transactions on the blockchain are classified into a transaction in a narrow sense and a transaction in a broad sense. The transaction in a narrow sense refers to a value transfer published by a user on the blockchain. For example, in a conventional bitcoin blockchain network, a transaction can be a transfer initiated by a user on a blockchain. The transaction in a broad sense refers to service data with a service intention published by a user on the blockchain. For example, an operator can build a consortium blockchain based on an actual service needs, and deploy some other types of online services (for example, event prediction, rental services, vehicle scheduling services, insurance claims services, credit services, and medical services) that are irrelevant to value transfer based on the consortium blockchain. In this type of consortium blockchain, a transaction can be a service message or a service request with a service intention published by a user in the consortium blockchain. A transaction in the present specification should be understood as a transaction in a broad sense.

In some implementations, because the blockchain uses a distributed database, the random character sequence published on the blockchain cannot be tampered with. As such, authenticity and reliability of the random character sequence can be ensured.

In some implementations, the random character sequence can be fed back to the participant, and the participant determines whether the random character sequence needs to be used. In one case, when a confirmation message returned by the participant is received, the random character sequence and the identity information of the corresponding participant are published on the blockchain in the way that identifies the correspondence. In another case, when a reselection message returned by the participant is received, the first smart contract can be re-invoked, and the first smart contract is used to generate a new random character sequence, to update the random character sequence. The updated random character sequence can also be fed back to the participant for confirmation by the participant. The participant can repeat the previous process to confirm or continue to update the random character sequence.

Step 106: Invoke a second smart contract for allocating benefit certificates, where the second smart contract is used to read the random character sequence and the target character sequence and to allocate a first benefit certificate to the participant when the random character sequence matches the target character sequence.

In some implementations, processing logic for comparing the random character sequence with the target character sequence and processing logic for allocating the first benefit certificate based on a comparison result can be pre-written in the second smart contract, so that the second smart contract can be used to automatically determine, based on the read random character sequence and target character sequence, whether the first benefit certificate needs to be allocated to the corresponding participant. The processing logic in the second smart contract is public content, and the entire processing process is automatically completed by using the smart contract without no manual intervention. Therefore, it can be ensured that the comparison between the random character sequence and the target character sequence or the allocation of the first benefit certificate is objective and fair.

In some implementations, when the random character sequence is the same as the target character sequence, it can be determined that the random character sequence matches the target character sequence. Because of randomness of the random character sequence and the target character sequence, there can be one or more random character sequence matching the target character sequence, and there can be no random character sequence matching the target character sequence.

In some implementations, the target character sequence can be generated by an off-chain object and broadcast on the blockchain. In one case, the target character sequence can be published on the blockchain by an oracle node on the blockchain, and accuracy of the actual result can be ensured because data provided by the oracle node is considered reliable. In another case, the target character sequence can be published on the blockchain by any blockchain node on the blockchain after a consensus is reached. For example, the any blockchain node can initiate consensus processing on the blockchain to confirm the target character sequence provided by the any blockchain node. When a consensus on the target character sequence is reached by blockchain nodes, the target character sequence can be used to compare with the random number sequence. For example, the any blockchain node can invoke the previous first smart contract to randomly generate the target character sequence by using the processing logic included in the first smart contract.

In some implementations, the target character sequence can be generated by invoking the previous first smart contract. As such, randomness of the target character sequence can be ensured, and it can be ensured that the target character sequence satisfies the previous predetermined rule, and human intervention and counterfeiting can be alleviated in the generation process of the target character sequence.

In some implementations, the first benefit certificate can be a smart asset certificate on the blockchain, and the second smart contract can be used to directly allocate the smart asset certificate to the participant. For example, the smart asset certificate is bound on a blockchain account corresponding to the participant on the blockchain. The smart asset certificate represents a benefit that can be obtained by the participant on the blockchain, for example, a blockchain asset and operation permission on the blockchain. Implementations are not limited in the present specification.

In some implementations, the first benefit certificate can be an off-chain benefit certificate outside the blockchain, and the second smart contract can be used to send an allocation instruction to an off-chain object to instruct the off-chain object to allocate the off-chain benefit certificate to the participant. For example, the off-chain benefit certificate is bound to an off-chain account of the participant. The off-chain benefit certificate can include certificates used to represent any type of off-chain benefits such as membership scores in a membership system, coupons, redemption coupons, and exchange coupons on a trading platform, data read permission, permission to use network resources, and permission to use storage space. Implementations are not limited in the present specification.

In some implementations, a blockchain node can publish a matching result between the random character sequence and the target character sequence on the blockchain for viewing and verification by the participant, regulators, or any other objects.

In some implementations, it can be determined that a second benefit certificate held by the participant is frozen as a participation certificate of the participant, and the second smart contract is used to terminate the ownership of the participation certificate from the participant when the random character sequence does not match the target character sequence. The second benefit certificate held by the participant is frozen as the participation certificate, to set a specific participation threshold for the participant. As such, the quantity of participants can be limited to some extent. The participant can require the blockchain node to invoke the first smart contract for multiple times, so that the participant can have multiple corresponding random character sequences. For each random character sequence, the participant can be required to freeze a corresponding participation certificate. Otherwise, generation of the corresponding random character sequence can be rejected.

In some implementations, a benefit amount represented by the first benefit certificate is positively correlated with a benefit amount represented by the second benefit certificate. A higher benefit amount represented by the second benefit certificate indicates that the participant invests more resources to compete for the first benefit certificate. Therefore, the benefit amount represented by the first benefit certificate can be correspondingly increased to encourage the participant.

In some implementations, even if the participant does not freeze the second benefit certificate to form a participation certificate, the participant still can participate in allocation of the first benefit certificate, and can obtain the first benefit certificate when the random character sequence matches the target character sequence. In another implementation, when the participant does not freeze the second benefit certificate to form a participation certificate, generation of the corresponding random character sequence for the participant can be rejected, or it is determined that the random character sequence corresponding to the participant is invalid, so that the participant cannot participate in the allocation of the first benefit certificate. Alternatively, when the random character sequence matches the target character sequence, the first benefit certificate can be allocated to the participant, but the first benefit certificate cannot represent any benefit, which is equivalent to that no benefit certificate is allocated, making participation of the participant meaningless.

Figure 2:
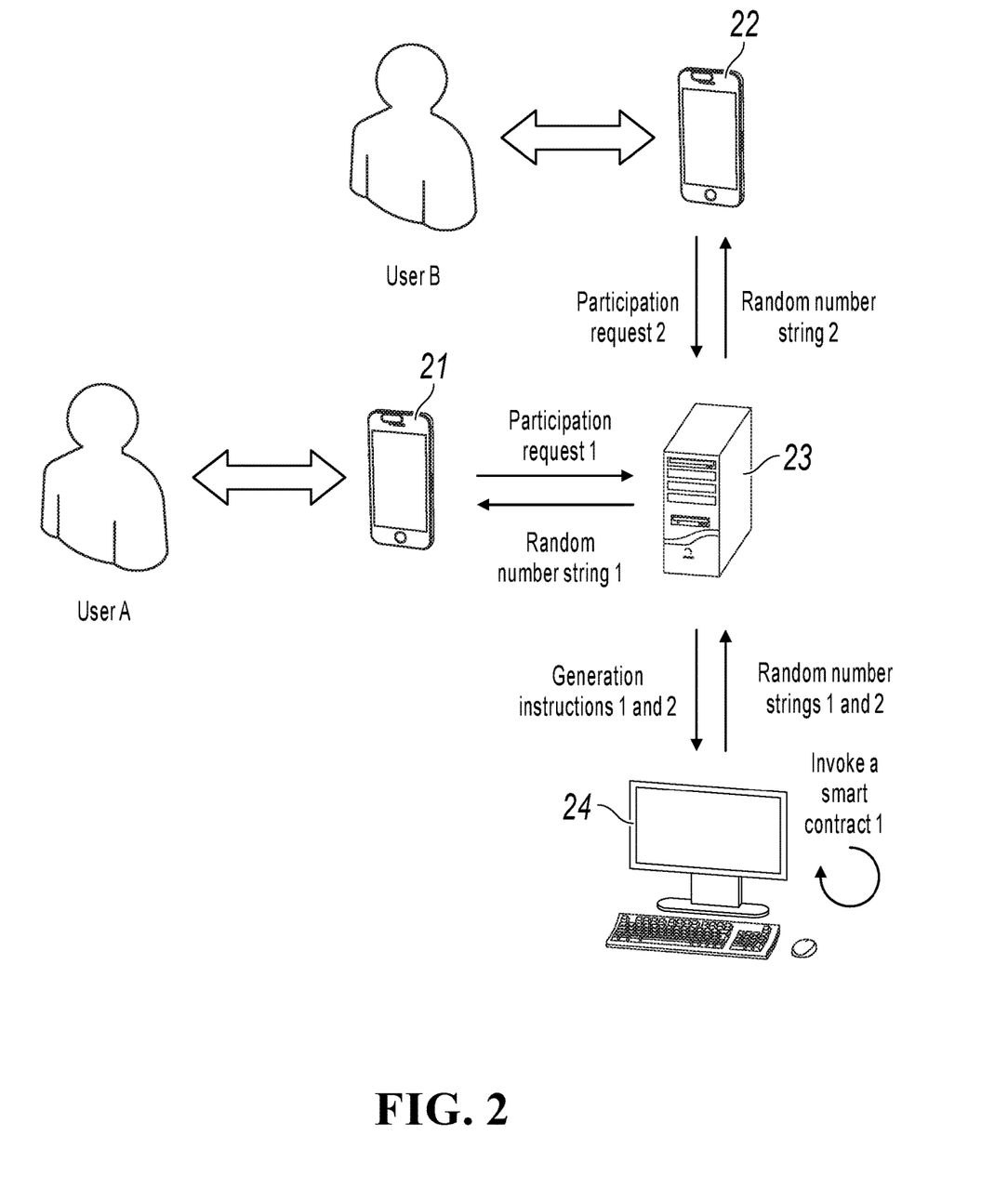
FIG. 2 is a schematic diagram illustrating generating a random number string, according to an example implementation.

For ease of understanding, the following describes the benefit allocation solution in the present specification by using an example of allocating a blockchain resource on the blockchain. FIG. 2 is a schematic diagram illustrating generating a random number, according to an example implementation. As shown in FIG. 2, assume that user A wants to participate in obtaining a blockchain resource. In this case, user A can initiate a participation request 1 to a device 23 by using a mobile phone 21 with a client device installed. Similarly, when user B wants to participate in obtaining the blockchain resource, user B can initiate a participation request 2 to the device 23 by using a mobile phone 22 with a client device installed.

The device 23 is configured as a server for managing resource allocation. The device 23 interacts with the mobile phones 21 and 22, etc. used by users A and B, etc. to receive the participation requests 1 and 2, etc., and interacts with a device 24. The device 24 is configured as a blockchain node on a blockchain to assist the device 23 in allocating the blockchain resource. The allocation process of the blockchain resource can include two stages: In the first stage, a corresponding random number string is generated for each participant such as user A and user B, and in the second stage, the blockchain resource is allocated based on the random number string corresponding to each participant. The two stages are separately described below.

Figure 3:
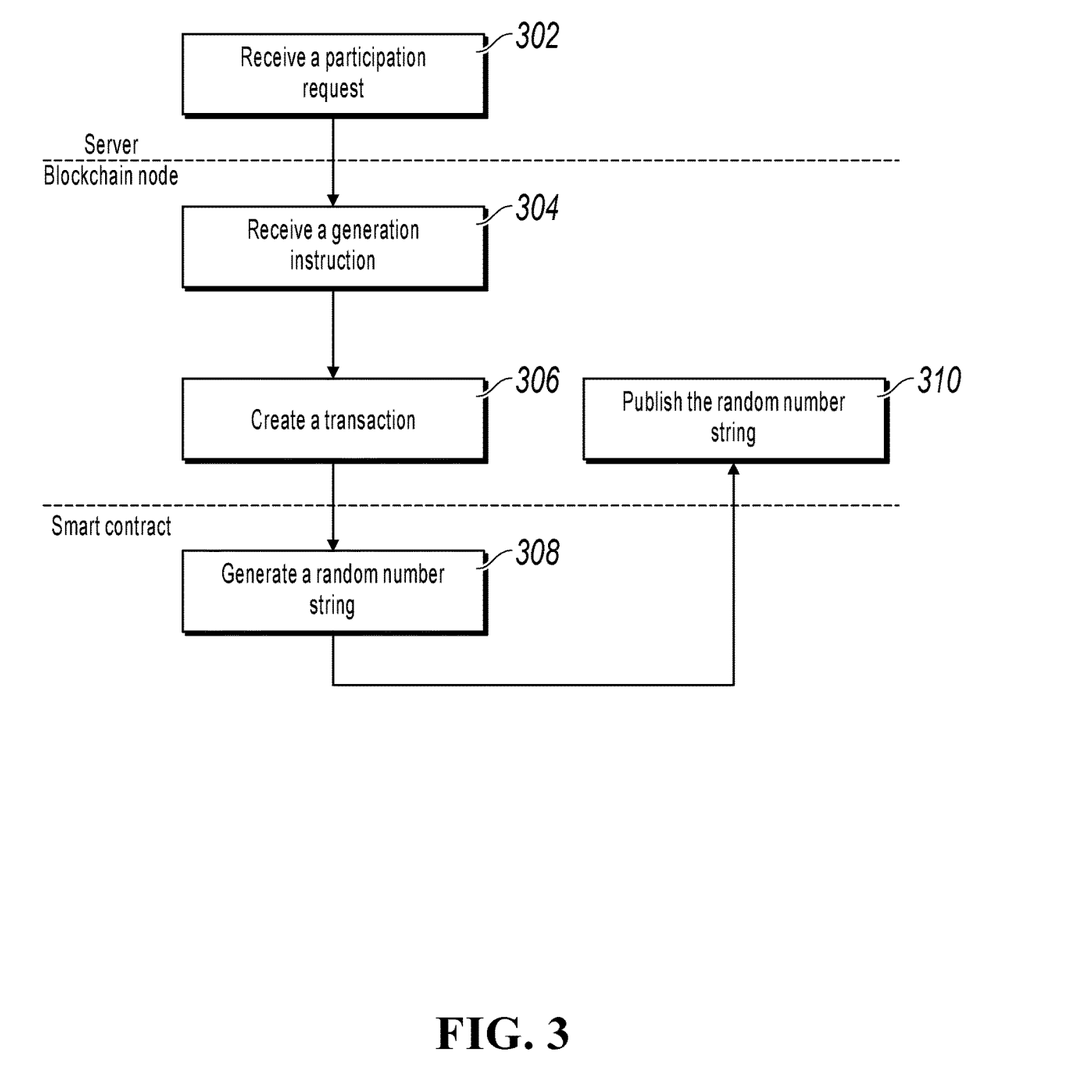
FIG. 3 is a schematic diagram illustrating generating a random number string, according to an example implementation.

FIG. 3 is a schematic diagram illustrating generating a random number string, according to an example implementation. As shown in FIG. 3, step 302 is performed at the device 23 served as a server, steps 304, 306, and 310 are performed at the device 24 served as a blockchain node, and step 308 is performed at a smart contract invoked by the device 24. The process of generating a random number string can include the following steps.

Step 302: The device 23 receives a participation request from a participant.

In some implementations, user A and user B can be participants, and the device 23 can receive the participation request 1 initiated by user A by using the mobile phone 21, and receive the participation request 2 initiated by user B by using the mobile phone 22.

Step 304: The device 24 receives a generation instruction sent by the device 23.

In some implementations, user A is used as an example. After receiving the participation request 1 initiated by user A by using the mobile phone 21, the device 23 can send a generation instruction 1 to the device 24. The generation instruction 1 is used to instruct the device 24 to trigger a generation step of a random number string to generate a random number string 1 corresponding to user A. Similarly, in response to the participation request 2 initiated by user B by using the mobile phone 22, the device 23 can send a generation instruction 2 to the device 24. The generation instruction 2 is used to instruct the device 24 to trigger the generation step of a random number string to generate a random number string 2 corresponding to user B.

Step 306: The device 24 creates a transaction, and publishes the transaction on a blockchain.

Step 308: A smart contract 1 is triggered by the transaction created by the device 24 to generate a random number string.

In some implementations, the smart contract 1 can be used to scan a transaction on the blockchain, and the smart contract 1 is invoked after the transaction published by the device 24 in step 306 is scanned. In other implementations, the device 24 can invoke the smart contract 1 in other methods. For example, the device 24 directly sends a created transaction to a contract address of the smart contract 1. Implementations are not limited in the present specification.

In some implementations, function logic for generating a random number string is predefined in the smart contract 1, so that the smart contract 1 can be used to automatically generate, based on the function logic, a random number string that satisfies a predetermined rule. For example, the predetermined rule can be used to indicate a length and a numerical range of the random number string. Because the smart contract 1 is published on the blockchain, the function logic defined in the smart contract 1 is public data. Therefore, objectivity and fairness of the generation result of the random number string is ensured, and cases such as black box operation caused by human intervention are alleviated.

Step 310: The device 24 obtains the random number string generated by using the smart contract 1, and publishes the random number string on the blockchain.

In some implementations, user A is used as an example. When the smart contract 1 is used to generate the random number string 1 for user A, the device 24 can create a transaction. The transaction includes the random number string 1 and identity information of user A. Consensus processing is then performed on the transaction on the blockchain, so that the transaction can be published on the blockchain after a consensus is reached, to record the transaction in a distributed database of the blockchain, that is, "broadcast the transaction on the blockchain". A type of a used consensus algorithm is not limited in the present specification. For example, when the blockchain in which the device 24 is located is a consortium blockchain or a public blockchain, the device 24 can initiate consensus processing to other blockchain nodes based on an algorithm such as a practical *byzantine* fault tolerance (PBFT) algorithm, and publish the transaction on the blockchain after a consensus is reached, so that the transaction is recorded in the distributed database of the blockchain. For another example, when the blockchain in which the device 24 is located is a public blockchain, the device 24 can compete for accounting rights with other blockchain nodes based on a proof of work (PoW) algorithm, a proof of stake (PoS) algorithm, or other algorithms, and a blockchain node that obtains the accounting rights records transaction data in a corresponding block. When the transaction that includes the random number string 1 and the identity information of user A is recorded, the random number string 1 and the identity information of user A can be recorded in the distributed database of the blockchain in the way that identifies the correspondence. Similarly, a random number string corresponding to user B or another user and identity information of the corresponding user can also be recorded on the blockchain in the way that identifies the correspondence. Details are omitted here for simplicity.

In some implementations, the device 24 can first return the random number string 1 to the device 23, so that the device 23 can return the random number string 1 to the mobile phone 21 for viewing and confirmation by user A. When user A determines to use the random number string 1, user A can send an confirmation message to the device 23 by using the mobile phone 21, and the device 23 can instruct the device 24 to broadcast the random number string 1 and the identity information of user A on the blockchain in the way that identifies the correspondence. When user A does not want to use the random number string 1, user A can send a reselection message to the device 23 by using the mobile phone 21, the device 23 can instruct the device 24 to discard the random number string 1 or avoid instructing the device 24 to broadcast the random number string 1 and the identity information of user A on the blockchain in the way that identifies the correspondence, and the device 23 can trigger steps 304 to 310 again to generate an updated random number string 1 for confirmation by user A. User A can require, for multiple times, the device 23 to update/replace the generated random number string until a satisfactory random number string is obtained. Similarly, user B or other users can confirm or require replacement of the random number string generated by using the smart contract 1. Details are omitted here for simplicity.

In some implementations, each participant can request to generate multiple random number strings. The probability that the participant obtains a blockchain resource can increase with addition of a random number string. Therefore, a specific participation threshold can be set for the participant to ensure fair competition. User A is still used as an example. When user A initiates the participation request 1 by using the mobile phone 21, certain benefit certificate held by user A can be frozen as a participation certificate of user A. For example, the participation certificate can be an off-chain benefit certificate such as a membership score or a participation ticket of user A for an off-chain object, or the participation certificate can be a smart asset certificate held by user A on the blockchain. Implementations are not limited in the present specification. When user A holds multiple participation certificates, the multiple participation certificates can be used to obtain multiple random number strings, or can be applied to the same random number string. Implementations are not limited in the present specification.

In some implementations, the participation certificate is optional, and all participants can request to obtain corresponding random number strings without providing participation certificates. However, the quantity of random number strings that can be obtained by each participant should be limited. For example, each participant can obtain only one random number string or no more than three random number strings, to ensure that all the participants have the same or approximately the same probability to obtain the blockchain resource.

Figure 4:
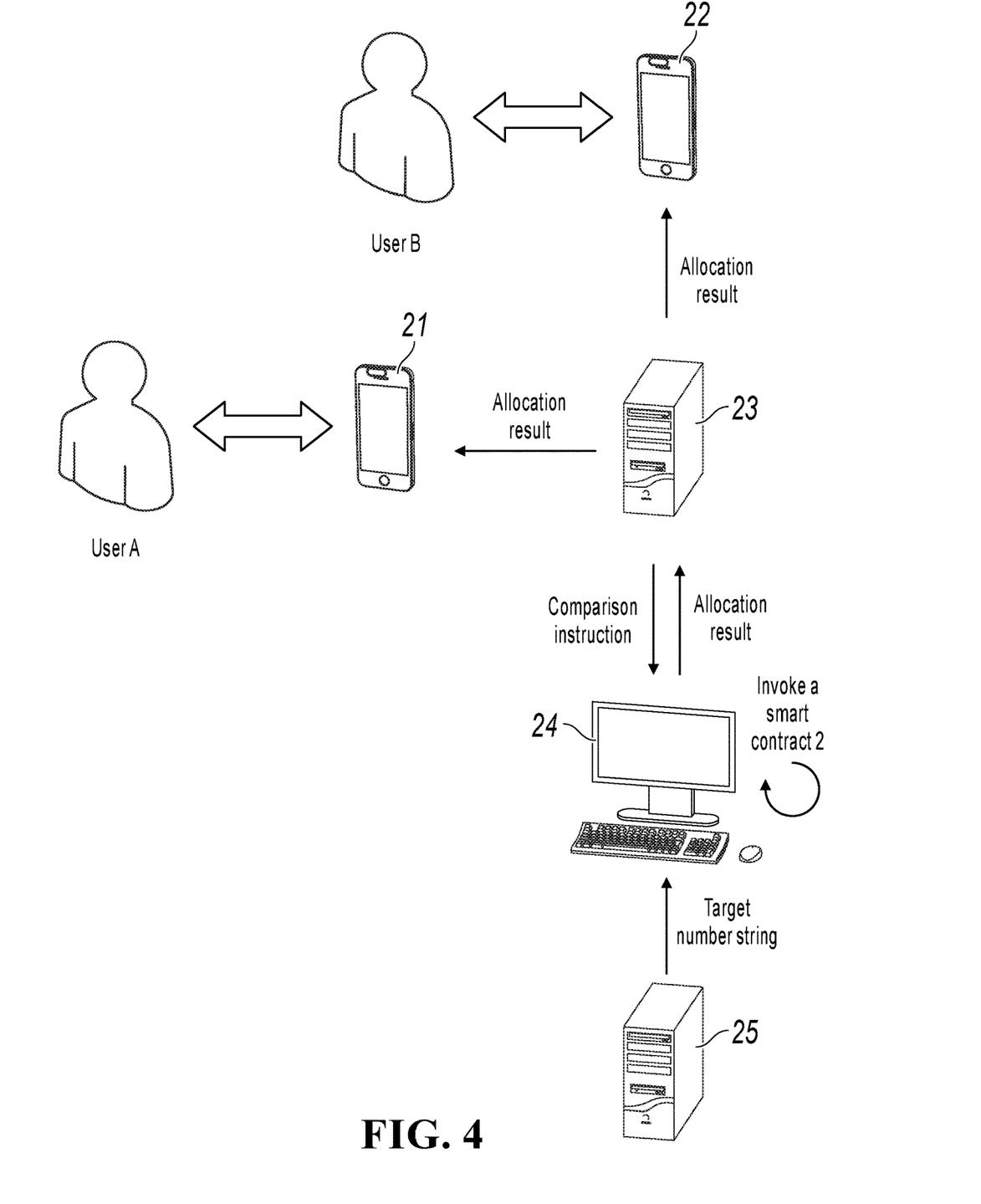
FIG. 4 is a schematic diagram illustrating allocating a blockchain resource, according to an example implementation.
Figure 5:
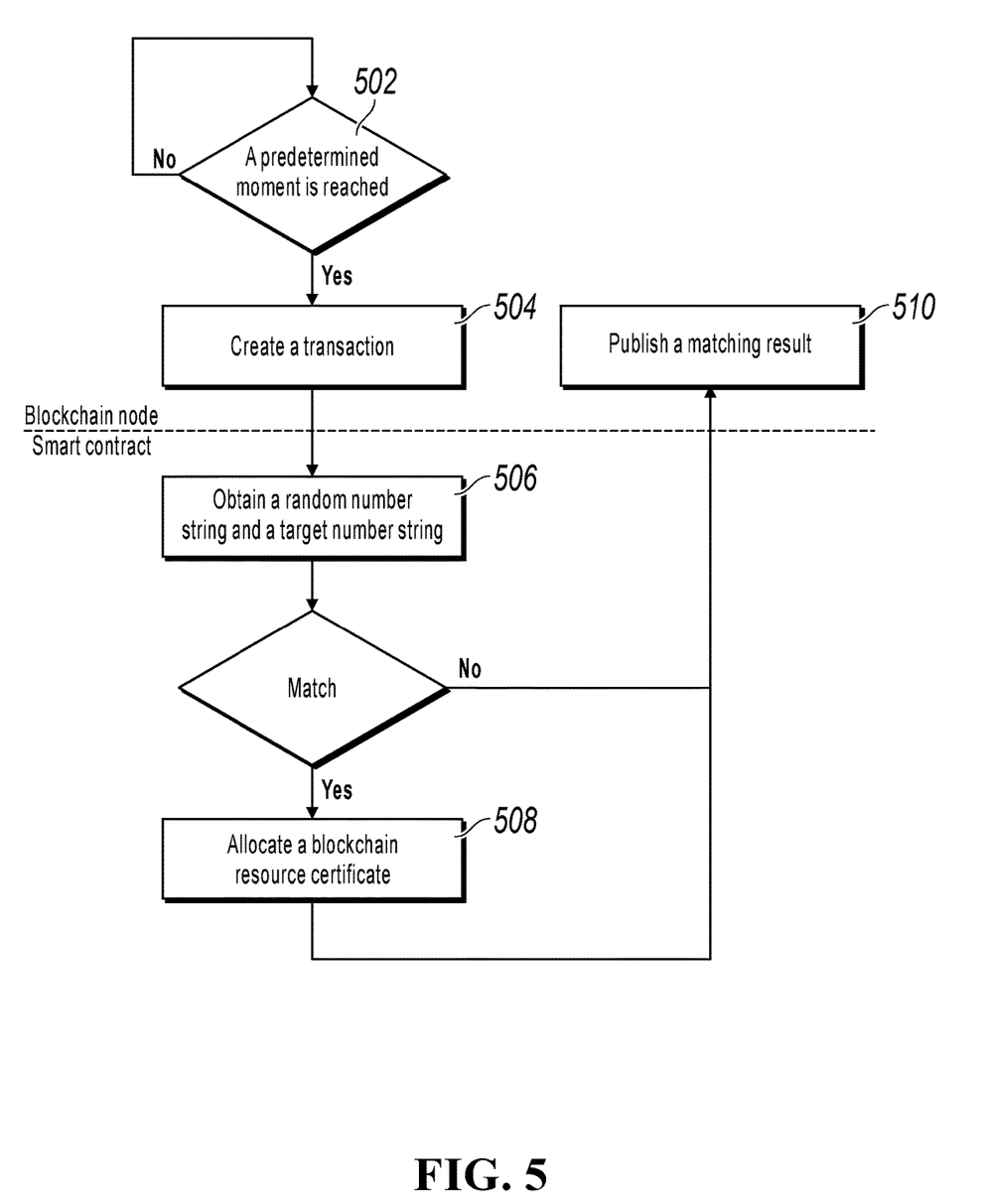
FIG. 5 is a schematic diagram illustrating allocating a blockchain resource, according to an example implementation.

FIG. 4 is a schematic diagram illustrating allocating a blockchain resource, according to an example implementation. Correspondingly, FIG. 5 is a schematic diagram illustrating allocating a blockchain resource, according to an example implementation. As shown in FIG. 5, steps 502, 504, and 510 are performed at the device 24 served as a blockchain node, and steps 506 and 508 are performed at a smart contract invoked by the device 24. The process of generating a random number string can include the following steps.

Step 502: The device 24 determines whether a predetermined moment is reached.

In some implementations, a blockchain resource can be periodically allocated, and the predetermined moment in each period can be determined based on a predefined period length. In another implementation, the blockchain resource is periodically allocated, and the predetermined moment can be defined based on an actual situation. Implementations are not limited in the present specification.

Step 504: The device 24 creates a transaction, and publishes the transaction on a blockchain.

Step 506: A smart contract 2 is triggered by the transaction created by the device 24 to obtain a random number string and a target number string, to determine whether the random number string matches the target number string.

In some implementations, the smart contract 2 can be used to scan a transaction on the blockchain, and the smart contract 2 is invoked after the transaction published by the device 24 in step 504 is scanned. In other implementations, the device 24 can invoke the smart contract 2 in other methods. For example, the device 24 directly sends a created transaction to a contract address of the smart contract 2. Implementations are not limited in the present specification.

In some implementations, function logic for obtaining and comparing the random number string and the target number string is predefined in the smart contract 2, so that the smart contract 2 can be used to automatically obtain the random number string and the target number string based on the function logic and to compare the random number string and the target number string.

In some implementations, by performing step 310 shown in FIG. 3, the random number strings are respectively recorded in the transactions on the blockchain. These transactions can be marked as being related to allocation of the blockchain resource, so that the smart contract 2 can be used to identify these transactions from the blockchain and obtain the random number strings. For example, the smart contract 2 can be used to obtain, by scanning a transaction with a specific address or a transaction with a specific serial number, a random number string included in the corresponding transaction.

In some implementations, a target number string imported by an oracle node 25 is recorded in a transaction on the blockchain, and the transaction is marked as being related to the allocation of the blockchain resource, so that the smart contract 2 can be used to identify the transaction from the blockchain and obtain the target number string. For example, the smart contract 2 can be used to obtain, by scanning a transaction with a specific address or a transaction with a specific serial number, a target number string included in the corresponding transaction. The oracle node 25 can obtain the target number string from a predetermined off-chain object, and the off-chain object can obtain the target number string through notarized lottery, computer random generation, etc.

In some implementations, the device 24 can invoke the smart contract 1, for example, by using a method similar to that in steps 306 and 308, to enable the smart contract 1 to randomly generate a number string based on predefined function logic, and the number string is used as the target number string. The device 24 then can publish the target number string on the blockchain by using a transaction, and the transaction is obtained and compared with the random number string by using the smart contract 2. As described above, the function logic defined in the smart contract 1 is public data. Therefore, objectivity and fairness of the generation result of the target number string is ensured, and cases such as black box operation caused by human intervention are alleviated.

In some implementations, there are corresponding generation moments for both the random number string and the target number string. Before the random number string is compared with the target number string, it should be determined that the generation moment of the random number string is earlier than the generation moment of the target number string, to alleviate fraud caused because the participant determines the target number string before obtaining the random number string. In addition, it can be defined that the generation moment of the random number string should be later than a generation moment of a previously used target number string (which has been used for comparison with a random number string to allocate a blockchain resource), to prevent one random number string from being repeatedly compared with different target number strings.

Step 508: The smart contract 2 is used to allocate a blockchain resource certificate to a corresponding participant when the random number string matches the target number string.

In some implementations, user A is used as an example. Assume that the random number string 1 corresponding to user A matches the target number string. In this case, the smart contract 2 can be used to allocate the blockchain resource certificate to user A. The blockchain resource certificate represents a corresponding blockchain resource on the blockchain.

In some implementations, when user A is not required to freeze a benefit certificate to form a participation certificate in advance, a benefit amount represented by the allocated blockchain resource certificate is a predetermined amount.

In some implementations, when user A freezes a participation certificate in advance, a benefit amount represented by the allocated blockchain resource certificate is positively correlated with a benefit amount represented by the participation certificate. For example, when user A freezes one participation certificate, the allocated blockchain resource certificate represents a benefit amount of a, and when user A freezes five participation certificates, the allocated blockchain resource certificate represents a benefit amount of 5a. The benefit amount represented by the allocated blockchain resource certificate may not be greater than a predetermined maximum value.

In some implementations, when the random number string 1 corresponding to user A does not match the target number string, if user A freezes a participation certificate in advance, the smart contract 2 can be used to control termination of the ownership of the participation certificate from user A, which serves as a cost of user A to participate in competition of the blockchain resource. As such, user A can be prevented from arbitrarily participating in competition, which helps to ensure fairness.

When the participation certificate is a frozen blockchain benefit certificate, the smart contract 2 can be used to directly deduct the participation certificate. When the participation certificate is a frozen off-chain benefit certificate, the smart contract 2 can be used to send a deduction instruction to a manager of the participation certificate to instruct the manager to deduct the participation certificate.

Step 510: The device 24 obtains a matching result returned by the smart contract 2, and publishes the matching result on the blockchain.

In some implementations, the matching result is broadcast on the blockchain for subsequent viewing, verification, etc., to ensure that the matching result is authentic and reliable.

Figure 6:
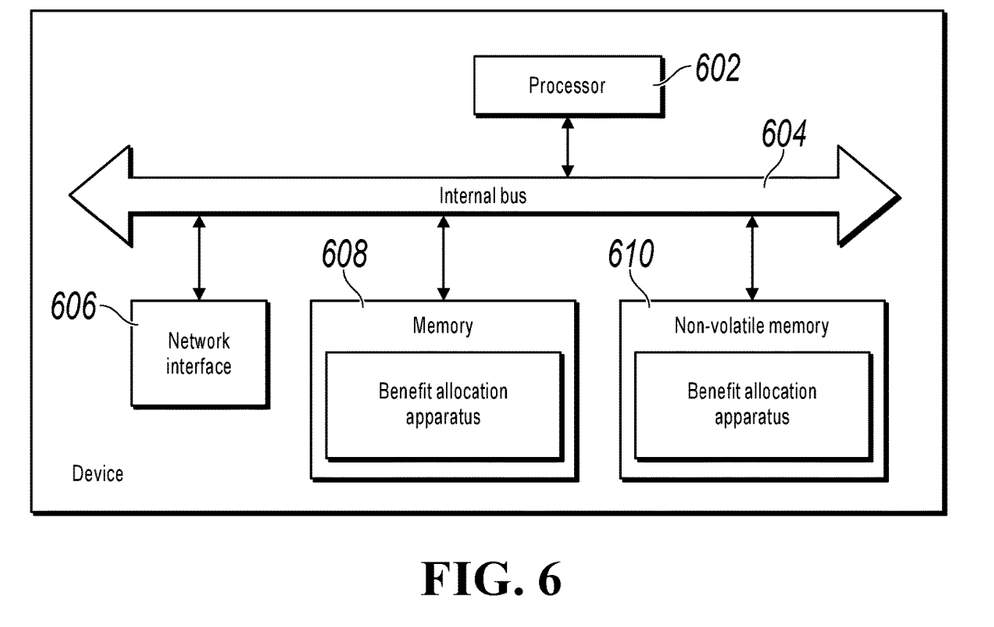
FIG. 6 is a schematic structural diagram of a device, according to an example implementation.

FIG. 6 is a schematic structural diagram of a device, according to an example implementation. Referring to FIG. 6, at a hardware level, the device includes a processor 602, an internal bus 604, a network interface 606, a memory 608, and a nonvolatile memory 610, and certainly, can further include hardware needed for other services. The processor 602 reads a corresponding computer program from the nonvolatile memory 610, and runs the computer program in the memory 608 to form a benefit allocation apparatus at a logical level. Certainly, implementations other than a software implementation are not excluded in the one or more implementations of the present specification, for example, a logic device or a combination of software and hardware. That is, an execution body of the following processing procedures is not limited to a logic unit, and can be hardware or a logic device.

Figure 7:
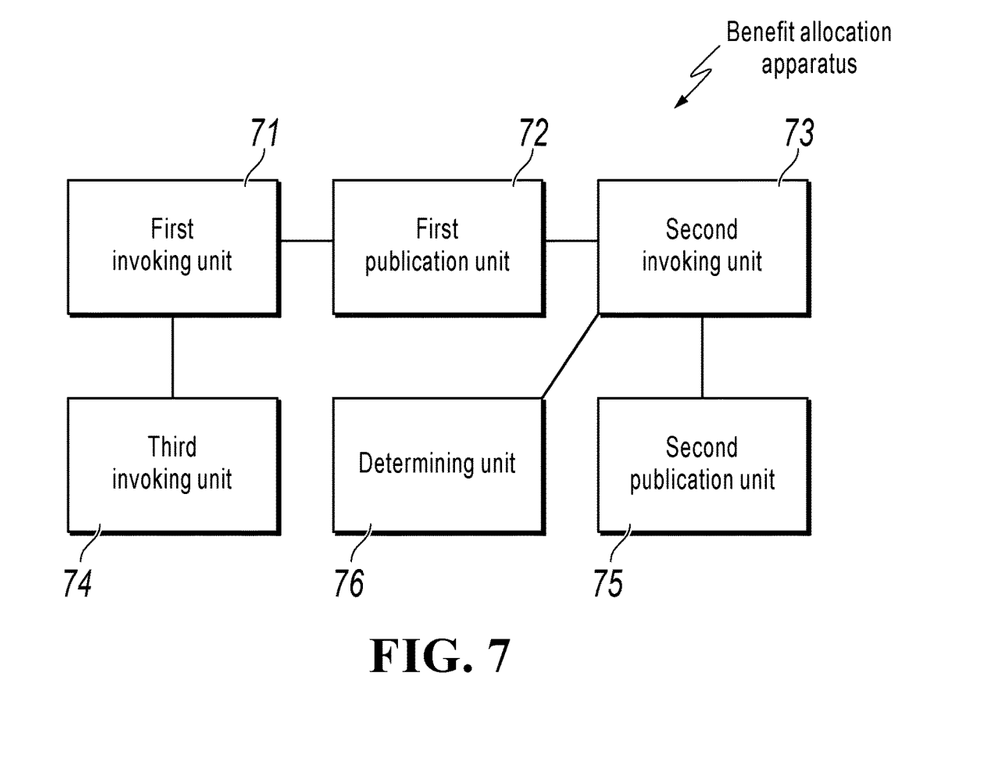
FIG. 7 is a block diagram illustrating a benefit allocation apparatus, according to an example implementation.

Referring to FIG. 7, in a software implementation, the benefit allocation apparatus is applied to a blockchain node. The apparatus can include: a first invoking unit 71, configured to invoke a first smart contract for generating a character sequence, where the first smart contract is used to generate a random character sequence that satisfies a predetermined rule for a participant, and a first generation moment of the random character sequence is earlier than a second generation moment of a target character sequence that satisfies the predetermined rule; a first publication unit 72, configured to publish the random character sequence and identity information of the participant on a blockchain in the way that identifies the correspondence; and a second invoking unit 73, configured to invoke a second smart contract for allocating benefit certificates, where the second smart contract is used to read the random character sequence and the target character sequence and to allocate a first benefit certificate to the participant when the random character sequence matches the target character sequence.

Optionally, the target character sequence is read from the blockchain by using the second smart contract, and the target character sequence is published on the blockchain by an oracle node on the blockchain; or the target character sequence is read from the blockchain by using the second smart contract, and the target character sequence is published on the blockchain by any blockchain node on the blockchain after a consensus is reached.

Optionally, the first publication unit 72 is specifically configured to feed back the random character sequence to the participant; and publish the random character sequence and the identity information of the corresponding participant on the blockchain in the way that identifies the correspondence when a confirmation message returned by the participant is received.

Optionally, the apparatus further includes: a third invoking unit 74, configured to re-invoke the first smart contract when a reselection message returned by the participant is received, to update the random character sequence.

Optionally, when the first benefit certificate is a smart asset certificate on the blockchain, the second smart contract is used to allocate the smart asset certificate to the participant; or when the first benefit certificate is an off-chain benefit certificate outside the blockchain, the second smart contract is used to send an allocation instruction to an off-chain object to instruct the off-chain object to allocate the off-chain benefit certificate to the participant.

Optionally, the apparatus further includes: a second publication unit 75, configured to publish a matching result between the random character sequence and the target character sequence on the blockchain.

Optionally, the apparatus further includes: a determining unit 76, configured to determine that a second benefit certificate held by the participant is frozen as a participation certificate of the participant, where the second smart contract is used to terminate the ownership of the participation certificate from the participant when the random character sequence does not match the target character sequence.

Optionally, a benefit amount represented by the first benefit certificate is positively correlated with a benefit amount represented by the second benefit certificate.

The system, apparatus, module, or unit illustrated in the previously described implementations can be specifically implemented by a computer chip or an entity, or can be implemented by a product having a certain function. A typical implementation device is a computer. Specific forms of the computer can be a personal computer, a laptop computer, a cellular phone, a camera phone, a smartphone, a personal digital assistant, a media player, a navigation device, an e-mail transceiver, a game console, a tablet computer, a wearable device, or any combination of several of these devices.

In a typical configuration, the computer includes one or more processors (CPUs), input/output interfaces, network interfaces, and memories.

The memory can include a non-persistent memory, a random access memory (RAM), a nonvolatile memory, and/or another form that are in a computer-readable medium, for example, a read-only memory (ROM) or a flash memory (flash RAM). The memory is an example of the computer readable medium.

The computer-readable medium includes persistent, non-persistent, removable, and irremovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, magnetic disk storage, a quantum memory, a graphene-based storage medium, another magnetic storage device, or any other non-transmission medium. The computer storage medium can be used to store information accessible by a computing device. Based on the definition in the present specification, the computer readable medium does not include transitory computer readable media (transitory media) such as a modulated data signal and carrier.

It is worthwhile to further note that the term "include", "comprise", or their any other variant is intended to cover a nonexclusive inclusion, so that a process, a method, a product, or a device that includes a series of elements not only includes these elements, but also includes other elements which are not expressly listed, or further includes elements inherent to such process, method, product, or device. An element described by "includes a . . . " further includes, without more constraints, another same or identical element in the process, method, product, or device that includes the element.

Specific implementations of the present specification are described above. Other implementations fall within the scope of the appended claims. In some cases, the actions or steps described in the claims can be performed in a sequence different from that in the implementations, and the desired results can still be achieved. In addition, the process described in the accompanying drawings does not necessarily require a particular sequence or sequential sequence shown to achieve the desired results. In some implementations, multi-tasking and parallel processing can be advantageous.

The terms used in the one or more implementations of the present specification are merely intended to describe the particular implementations, and are not intended to limit the one or more implementations of the present specification. The singular forms "a" and "the" used in the one or more implementations of the present specification and the appended claims are also intended to include plural forms unless other meanings are clearly represented in the context. It should be also understood that the term "and/or" used in the present specification refers to any or all possible combinations of one or more associated listed items.

It should be understood that terms such as first, second, and third may be used in the one or more implementations of the present specification to describe various pieces of information, but the information should not be limited to those terms. These terms are used only to distinguish between the same type of information. For example, without departing from the scope of the one or more implementations of the present specification, first information can also be referred to as second information, and similarly, the second information can also be referred to as the first information. Depending on the context, the word "if" used here can be interpreted as "when" or "in response to determining".

The previous description is merely preferred implementations of the one or more implementations of the present specification, and is not intended to limit the one or more implementations of the present specification. Any modification, equivalent replacement, improvement, etc. made without departing from the spirit and principle of the one or more implementations of the present specification shall fall within the protection scope of the one or more implementations of the present specification.

What is claimed is:

1. A computer-implemented method performed by one or more blockchain nodes maintaining a distributed database for managing assets for a participant using benefit certificates and participation certificates using a first smart contract and a second smart contract, the method comprising:
   (a) in a first stage:
      receiving, by the one or more blockchain nodes, a participation request from the participant requesting a blockchain resource;
      freezing, by the one or more blockchain nodes, a second benefit certificate to create one or more participation certificates;
      based on determining that the second benefit certificate has been frozen, generating, by the one or more blockchain nodes, at the first smart contract, one or more random character sequences for the participant, the generated one or more random character sequences satisfying a predetermined rule;
      publishing, by the one or more blockchain nodes, the one or more random character sequences and identity information of the participant on a blockchain, wherein the one or more random character sequences and the identity information of the participant are associated;
   (b) in a second stage at the second smart contract:
      obtaining a target character sequence satisfying the predetermined rule, wherein the target character sequence is (i) generated by invoking the first smart contract for randomness, (ii) generated after the generation of the one or more random character sequences, and (iii) published on the blockchain;
      determining whether at least one of the one or more random character sequences matches the target character sequence based on whether the at least one of the one or more random character sequences is the same as the target character sequence;
      in response to determining that the at least one of the one or more random character sequences matches the target character sequence, allocating a first benefit certificate corresponding to the blockchain resource to the participant; and
      in response to determining that none of the one or more random character sequences match the target character sequence, terminating an ownership of a participation certificate of the one or more participation certificates; and
      publishing, by one or more blockchain nodes, a matching result between the at least one of the one or more random character sequences and the target character sequence on the blockchain.

2. The computer-implemented method of claim 1, wherein
   the target character sequence is read from the blockchain by using the second smart contract, and the target character sequence is published on the blockchain by an oracle node on the blockchain; or
   the target character sequence is read from the blockchain by using the second smart contract, and the target character sequence is published on the blockchain by any blockchain node on the blockchain after a consensus is reached.

3. The computer-implemented method of claim 1, wherein publishing the one or more random character sequences and the identity information of the participant on the blockchain comprises:
   for each random character sequence included in the one or more random character sequences,
      transmitting, by the one or more blockchain nodes, the random character sequence to the participant; and
      when receiving a confirmation message from the participant, publishing, by the one or more blockchain nodes, the random character sequence and the identity information of the participant on the blockchain.

4. The computer-implemented method of claim 3, further comprising:
   when receiving a reselection message from the participant, re-invoking, by the one or more blockchain nodes, the first smart contract to update the random character sequence.

5. The computer-implemented method of claim 1, wherein
   when the first benefit certificate is a smart asset certificate on the blockchain, the second smart contract is used to allocate the smart asset certificate to the participant; or when the first benefit certificate is an off-chain benefit certificate outside the blockchain, the second smart contract is used to send an allocation instruction to an off-chain object to instruct the off-chain object to allocate the off-chain benefit certificate to the participant.

6. The computer-implemented method of claim 1, wherein a benefit amount represented by the first benefit certificate is positively correlated with a benefit amount represented by the second benefit certificate.

7. A non-transitory, computer-readable medium storing one or more instructions executable by a computer system to perform operations maintaining a distributed database for managing assets for a participant using benefit certificates and participation certificates using a first smart contract and a second smart contract, the operations comprising:

(a) in a first stage:
  receiving a participation request from the participant requesting a blockchain resource;
  freezing a second benefit certificate to create one or more participation certificates;
  based on determining that the second benefit certificate has been frozen, generating at the first smart contract, one or more random character sequences for the participant, the generated one or more random character sequences satisfying a predetermined rule;
  publishing the one or more random character sequences and identity information of the participant on a blockchain, wherein the one or more random character sequences and the identity information of the participant are associated;

(b) in a second stage at the second smart contract:
  obtaining a target character sequence satisfying the predetermined rule, wherein the target character sequence is (i) generated by invoking the first smart contract for randomness, (ii) generated after the generation of the one or more random character sequences, and (iii) published on the blockchain;
  determining whether at least one of the one or more random character sequences matches the target character sequence based on whether the at least one of the one or more random character sequences is the same as the target character sequence;
  in response to determining that the at least one of the one or more random character sequences matches the target character sequence, allocating a first benefit certificate corresponding to the blockchain resource to the participant; and
  in response to determining that none of the one or more random character sequences match the target character sequence, terminating an ownership of a participation certificate of the one or more participation certificates; and
  publishing, a matching result between the at least one of the one or more random character sequences and the target character sequence on the blockchain.

8. The non-transitory, computer-readable medium of claim 7, wherein
  the target character sequence is read from the blockchain by using the second smart contract, and the target character sequence is published on the blockchain by an oracle node on the blockchain; or
  the target character sequence is read from the blockchain by using the second smart contract, and the target character sequence is published on the blockchain by any blockchain node on the blockchain after a consensus is reached.

9. The non-transitory, computer-readable medium of claim 7, wherein publishing the one or more random character sequences and the identity information of the participant on the blockchain comprises:
  for each random character sequence included in the one or more random character sequences,
    transmitting, the random character sequence to the participant; and
    when receiving a confirmation message from the participant, publishing the random character sequence and the identity information of the participant on the blockchain.

10. The non-transitory, computer-readable medium of claim 9, wherein the operations further comprise:
  when receiving a reselection message from the participant, re-invoking the first smart contract to update the random character sequence.

11. The non-transitory, computer-readable medium of claim 7, wherein
  when the first benefit certificate is a smart asset certificate on the blockchain, the second smart contract is used to allocate the smart asset certificate to the participant; or
  when the first benefit certificate is an off-chain benefit certificate outside the blockchain, the second smart contract is used to send an allocation instruction to an off-chain object to instruct the off-chain object to allocate the off-chain benefit certificate to the participant.

12. The non-transitory, computer-readable medium of claim 7, wherein a benefit amount represented by the first benefit certificate is positively correlated with a benefit amount represented by the second benefit certificate.

13. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations maintaining a distributed database for managing assets for a participant using benefit certificates and participation certificates using a first smart contract and a second smart contract, the one or more operations comprising:

(a) in a first stage:
  receiving a participation request from the participant requesting a blockchain resource;
  freezing a second benefit certificate to create one or more participation certificates of;
  based on determining that the second benefit certificate has been frozen, generating, at the first smart contract, one or more random character sequences for the participant, the generated one or more random character sequences satisfying a predetermined rule;
  publishing the one or more random character sequences and identity information of the participant on a blockchain, wherein the one or more random character sequences and the identity information of the participant are associated;

(b) in a second stage at the second smart contract:
  obtaining a target character sequence satisfying the predetermined rule, wherein the target character sequence is (i) generated by invoking the first smart contract for randomness, (ii) generated after the generation of the one or more random character sequences, and (iii) published on the blockchain;

determining whether at least one of the one or more random character sequences matches the target character sequence based on whether the at least one of the one or more random character sequences is the same as the target character sequence;

in response to determining that at least one of the one or more random character sequences matches the target character sequence, allocating a first benefit certificate corresponding to the blockchain resource to the participant; and in response to determining that none of the one or more random character sequences match the target character sequence, terminating an ownership of a participation certificate of the one or more participation certificates; and publishing a matching result between the at least one of the one or more random character sequences and the target character sequence on the blockchain.

14. The computer-implemented system of claim 13, wherein
the target character sequence is read from the blockchain by using the second smart contract, and the target character sequence is published on the blockchain by an oracle node on the blockchain; or
the target character sequence is read from the blockchain by using the second smart contract, and the target character sequence is published on the blockchain by any blockchain node on the blockchain after a consensus is reached.

15. The computer-implemented system of claim 13, wherein publishing the one or more random character sequences and the identity information of the participant on the blockchain comprises:
for each random character sequence included in the one or more random character sequences,
transmitting the random character sequence to the participant; and
when receiving a confirmation message from the participant, publishing the random character sequence and the identity information of the participant on the blockchain.

16. The computer-implemented system of claim 15, wherein the one or more operations further comprise:
when receiving a reselection message from the participant, re-invoking the first smart contract to update the random character sequence.

17. The computer-implemented system of claim 13, wherein
when the first benefit certificate is a smart asset certificate on the blockchain, the second smart contract is used to allocate the smart asset certificate to the participant; or
when the first benefit certificate is an off-chain benefit certificate outside the blockchain, the second smart contract is used to send an allocation instruction to an off-chain object to instruct the off-chain object to allocate the off-chain benefit certificate to the participant.

* * * * *

UNITED STATES PATENT AND TRADEMARK OFFICE
CERTIFICATE OF CORRECTION

PATENT NO. : 11,087,372 B2  
APPLICATION NO. : 17/081702  
DATED : August 10, 2021  
INVENTOR(S) : Lu Page 1 of 1

It is certified that error appears in the above-identified patent and that said Letters Patent is hereby corrected as shown below:

In the Claims

Column 15 / Line 23, In Claim 7, delete "generating" and insert -- generating, --, therefor.

Column 15 / Line 54, In Claim 7, delete "publishing," and insert -- publishing --, therefor.

Column 16 / Line 7, In Claim 9, delete "transmitting," and insert -- transmitting --, therefor.

Column 16 / Line 50, In Claim 13, delete "certificates of;" and insert -- certificates; --, therefor.

Column 17 / Line 6, In Claim 13, after "that" insert -- the --.

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*